United States Patent [19]

Teramachi

[11] Patent Number: 5,076,714
[45] Date of Patent: Dec. 31, 1991

[54] RECTILINEAR SLIDING BEARING AND ASSEMBLING METHOD THEREOF

[75] Inventor: Hiroshi Teramachi, Tokyo, Japan

[73] Assignee: THK Co., Ltd., Tokyo, Japan

[21] Appl. No.: 601,727

[22] PCT Filed: Feb. 28, 1990

[86] PCT No.: PCT/JP90/00259
§ 371 Date: Dec. 26, 1990
§ 102(e) Date: Dec. 26, 1990

[87] PCT Pub. No.: WO90/10159
PCT Pub. Date: Sep. 7, 1990

[30] Foreign Application Priority Data
Mar. 1, 1989 [JP] Japan ................................. 1-46439

[51] Int. Cl.$^5$ ................ F16C 29/06; B21D 53/10
[52] U.S. Cl. ........................... 384/45; 29/898.03
[58] Field of Search ......................... 384/43–45, 384/57, 54; 29/898.03, 898.07

[56] References Cited
U.S. PATENT DOCUMENTS

| | | | |
|---|---|---|---|
| 4,120,538 | 10/1978 | Headen | 384/43 |
| 4,527,841 | 7/1985 | Teramachi | 384/45 |
| 4,527,842 | 7/1985 | Teramachi | 384/45 |
| 4,630,872 | 12/1986 | Teramachi | 384/45 |

Primary Examiner—Thomas R. Hannon
Attorney, Agent, or Firm—Armstrong, Nikaido, Marmelstein, Kubovcik & Murray

[57] ABSTRACT

The rectilinear sliding bearing and its assembling method of the present invention is characterized in that an attaching surface (14) of a slider (B) to which a moving body (5) such as a table is fixed is made in the form of a curved surface having a small radius of curvature, whereby the elastic deformation of the attaching surface (14) which arises upon fixing of the moving body (5) acts to absorb or moderate the pitching of the slider (B) resulting from the attaching error of a rail (2), so that the positional accuracy of the moving body (5) guided by the slider (B) is enhanced.

4 Claims, 13 Drawing Sheets

RECTILINEAR SLIDING BEARING AND ASSEMBLING METHOD THEREOF

TECHNICAL FIELD

This invention relates to a rectilinear sliding bearing for rectilinearly guiding a moving body such as a table in a slide section of NC machines, machine tools, industrial robots, etc., and to a method of assembling the rectilinear sliding bearing to the moving body.

BACKGROUND ART

A conventional rectilinear sliding bearing comprises a rail to be fixed to a fixing section of a machine or the like which has axially-extending rolling surfaces on which rolling elements roll, a slider movable along the rail which has a load zone including load rolling surfaces provided in confronting relation to the rolling surfaces of the rail and a no-load zone for connecting both ends of the load zone, the two zones defining endless tracks, and a number of rolling elements for bearing loads between the load rolling surfaces of the slider and the rolling surfaces of the rail while circulating through the endless tracks. In practice, for example, a plurality of such rails are laid in parallel on the fixing section, and a moving body such as a table is connected to the slider.

This type of rectilinear sliding bearing can possess the so-called automatic adjusting function (of reducing a moment load acting on the bearing) by making the angle of contact of the load rolling surface with the rolling element close to the angle of contact of an outer ring with a ball in front combination form of an angular contact ball bearing (which is one type of rotary bearing) to short the distance between two working points appearing when loads act on the bearing. On the other hand, the bearing can also possess the so-called automatic aligning function (of causing a moment load acting on the slider to be effectively absorbed between a bearing race and a block) by dividing the slider having the automatic adjusting function into a substantially cylindrical bearing race having endless tracks and a block having a table attaching surface which is fitted on the bearing race.

In these rectilinear sliding bearings, even when there is the attaching error of the rail relative to the fixing section (such as the error in parallelism or, level of two or more rails), the slider can be smoothly moved and the moving body can be rectilinearly guided with accuracy.

However, where the rail has some vertical waving resulting from the disorder of the surface of the fixing section on which the rail is laid, improper tightening of rail fixing bolts, etc., the slider moving along such a rail undergoes pitching in the moving direction, so that the machining accuracy of a machine tool, for example, mounted on the moving body is degraded.

Figure 21:
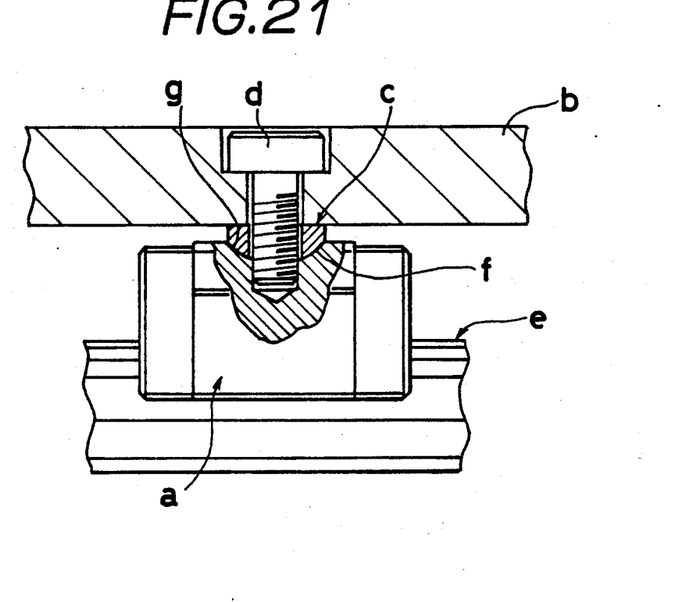
FIGS. 21 and 22 are a side view and da sectional front view, respectively, showing a conventional bearing.
Figure 22:
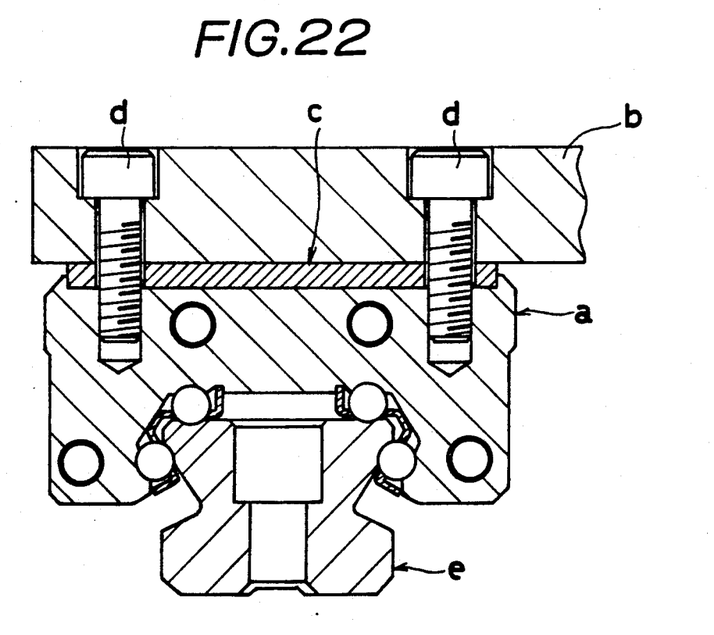

To overcome such a defect, Japanese Patent Laid-Open No. 62-188636 has proposed a rectilinear guide device. This, as shown in FIGS. 21 and 22, is characterized in that a gap retaining washer (c) is interposed between a slider (a) and a moving body (b) to retain a gap between them, and an attaching bolt (d) is passed through the gap retaining washer (c) and screwed into the slider (a) to connect the slider (a) and the moving body (b) together, whereby the structural error of rail (e) can be absorbed or moderated by means of the relative displacement between the slider (a) and the moving body (d) that results from the elastic deformation of the attaching bolt (d) (specifically, by a sliding contact action between an arcuate convex surface (f) of the gap retaining washer (c) and an arcuate concave surface (g) of the slider (a) or moving body (b)). In this rectilinear guide device, the pitching of the slider (a) is absorbed between the slider (a) and the moving body (b); therefore, the positional accuracy in movement of the moving body (b) is enhanced to overcome the foregoing defect.

However, the proposed rectilinear guide device has other defects. First, since the sliding contact action between the gap retaining washer (c) and the slider (a) or moving body (b) is utilized, when the amount of tightening of the attaching bolt (d) is large or the moving body (b) suffers a large load/weight, the coupling force between the slider (a) and the moving body (b) becomes strong, and a large frictional force acts between the arcuate convex surface (f) and the arcuate concave surface (g), whereby the function of relative displacement owing to sliding contact cannot be exerted sufficiently.

Second, if the area of sliding contact is decreased for the purpose of sufficiently exerting the function of relative displacement owing to sliding contact, a concentrated load acts on the slider (a) and the moving body (b), whereby the individual components (a), (b) tend to be deformed or damaged.

In view of the foregoing defects, it is an object of the present invention to provide a rectilinear sliding bearing of high reliability which can effectively absorb or moderate the attaching error of a rail.

It is another object of the present invention to provide a method of assembling a rectilinear sliding bearing which makes it possible to accomplish the first object.

DISCLOSURE OF THE INVENTION

According to a first feature of the present invention, a rectilinear sliding bearing comprises a slider of substantially C-shape in cross section having a horizontal portion, a pair of wing portions extending downward from both ends of the horizontal portion, a concave portion opened on the lower side which is defined by the horizontal portion and the two wing portions, an attaching surface to which a moving body such as a table is fixed by means of coupling bolts, a downward-facing upper load rolling surface and an upward-facing lower load rolling surface axially formed in the inner surface of each of the wing portions, and no-load rolling paths for defining endless tracks in conjunction with the upper and lower load rolling surfaces; a rail having rolling surfaces formed in confronting relation to the upper and lower load rolling surfaces along which the slider moves; and a number of rolling elements, such as balls or rollers, for bearing loads between the upper and lower load rolling surfaces of the slider and the rolling surfaces of the rail while circulating through the endless tracks; and is characterized in that the attaching surface of the slider is made in the form of a curved surface having a small radius of curvature in the moving direction so that when the moving body is fixed by tightening the coupling bolts, the attaching surface is brought into pressure contact with the moving body to undergo elastic deformation, and the elastic deformation of the attaching surface causes relative displacement between the slider and the moving body, thereby absorbing or moderating the structural error of the rail.

According to a second feature of the present invention, the foregoing first rectilinear sliding bearing is modified so that the slider is composed of a bearing race formed by cutting off an axially-extending portion of a cylindrical body to define the concave portion opened on the lower side, the inner surface of the concave portion having the upper and lower load rolling surfaces; and a block fitted on the bearing race and having the attaching surface to which the moving body such as a table is fixed by means of the coupling bolts.

According to a third feature of the present invention, the foregoing first rectilinear sliding bearing is modified so that the slider has a horizontal portion, tow wing portions extending downward from both ends of the horizontal portion, a concave portion opened in an obliquely downward direction which is defined by the horizontal portion and the two wing portions, an attaching surface to which a moving body such as a table is fixed by means of coupling bolts, a downwardly-inclined load rolling surface axially formed in the inner surface of one wing portion, an upwardly-inclined load rolling surface axially formed in the inner surface of the other wing portion, and no-load rolling paths for defining endless tracks in conjunction with the load rolling surfaces.

According to the present invention, a method of assembling a rectilinear sliding bearing in which a slider moves rectilinearly along a rail with interposition of a number of endlessly-circulatable rolling elements, such as balls or rollers, by fixing a moving body such as a table to the slider, comprises the steps of making the moving-body attaching surface of the slider into the form of a curved surface having a small radius of curvature in the moving direction, and bringing the moving body into pressure contact with the attaching surface by tightening coupling bolts to cause the attaching surface to undergo elastic deformation, whereby the elastic deformation of the attaching surface causes relative displacement between the slider and the moving body to absorb or moderate the structural error of the rail.

The workings of the foregoing technical matter will be described with reference to FIG. 20.

Figure 20A:
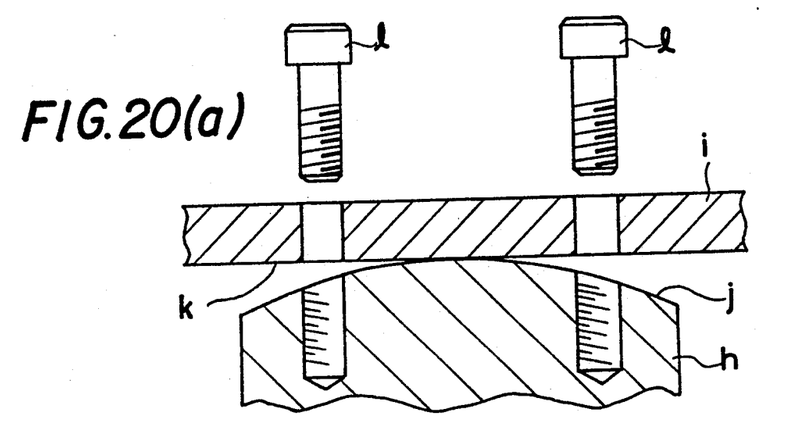
FIG. 20 is an explanatory view showing a fundamental method of assembling the rectilinear sliding bearing according to the present invention.

Since either an attaching surface (j) of a slider (h) or a surface (k) to be attached of a moving body (i) is curved (the surface of the slider (h) is curved in the drawing), before tightening coupling bolts (l), only the top of the curved surface (j) is in contact with the flat surface (k) (see FIG. 20(a)).

Figure 20B:
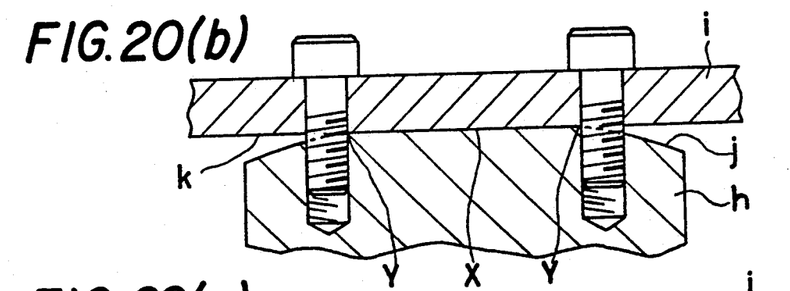

When the coupling bolts (l) are tightened, the slider (h) with the curved surface (j) undergoes elastic deformation if the rigidity of the moving body (i) with the flat surface (k) is sufficiently high, and the area of contact between the slider (h) and the moving body (i) increases with the amount of tightening of the coupling bolts (l) (see FIG. 20(b)).

Figure 20C:
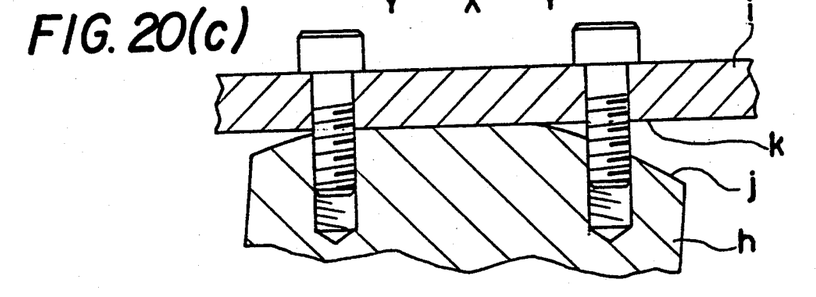

The pressure of surface contact in a contacting zone is the highest at the center X of the curved surface, decreases gradually as departing from the center X, and becomes substantially zero at each Y of the contacting zone. Therefore, when the slider (h) itself causes pitching in the moving direction, the coupling bolts undergo elastic deformation, such as elongation or nontraction, the slider (h) rolls in relation to the moving body (i) to shift the contacting zone between them as shown in FIG. 20(c), and thus, pitching is prevented from transferring to the moving body (i).

In FIG. 20, to facilitate understanding of the foregoing fundamental action, the radius of curvature of the attaching surface is shown in exaggerated form.

In the present invention, a small radius of curvature being given to the moving-body attaching surface of the slider is determined on the basis of an estimated magnitude of the attaching error of the rail. When the rail itself causes large vertical waving after being attached to a fixing section, the radius of curvature of the attaching surface is made somewhat larger to make difficult the transfer of the pitching of the slider to the moving body. For example, where the axial or longitudinal length of the slider is 100 mm, the difference between the sectional height at the center of the attaching surface of the slider and the sectional height at either axial end of the slider is set to about 0.01 mm to 0.05 mm.

The assembling method of the present invention is applicable to any slider of the foregoing three kinds of rectilinear sliding bearings, provided that the slider freely slidable on the rail has the endless tracks through which the rolling elements circulate and the curved moving-body attaching surface has a small radius of curvature. To enhance the moving accuracy of the moving body being attached to the slider, it is preferable that each of the two wing portions of the slider should have the downward-facing upper load rolling surface and the upward-facing lower load rolling surface to give the automatic adjusting function to the slider as is the case of the first kind of rectilinear sliding bearing. Further, it is preferable that the slider should be divided into the bearing race and the block to give the automatic aligning function to the slider as is the case of the second kind of rectilinear sliding bearing. Further, the moving-body attaching surface may be formed integrally on the slider, or a separate member having such an attaching surface may be mounted on the slider.

The number of endless tracks, the angle of inclination of the load rolling surface, and the like may be changed or modified depending on the field of applications of the bearing, the structure of the slider, and the like. Further, the no-load rolling path may be provided by boring a no-load rolling hole in the slider or attaching a rolling-element retainer to the slider.

The rolling element which circulates through the endless track may be in the form of a cylindrical roller, barrel-shaped roller, ball, etc.

BEST MODE FOR CARRYING OUT THE INVENTION

A rectilinear sliding bearing and an assembling method thereof of the present invention will now be described in greater detail with reference to the accompanying drawings.

FIRST EMBODIMENT

FIGS. 1 through 11 show a first embodiment of the rectilinear sliding bearing according to the present invention.

Figure 1:
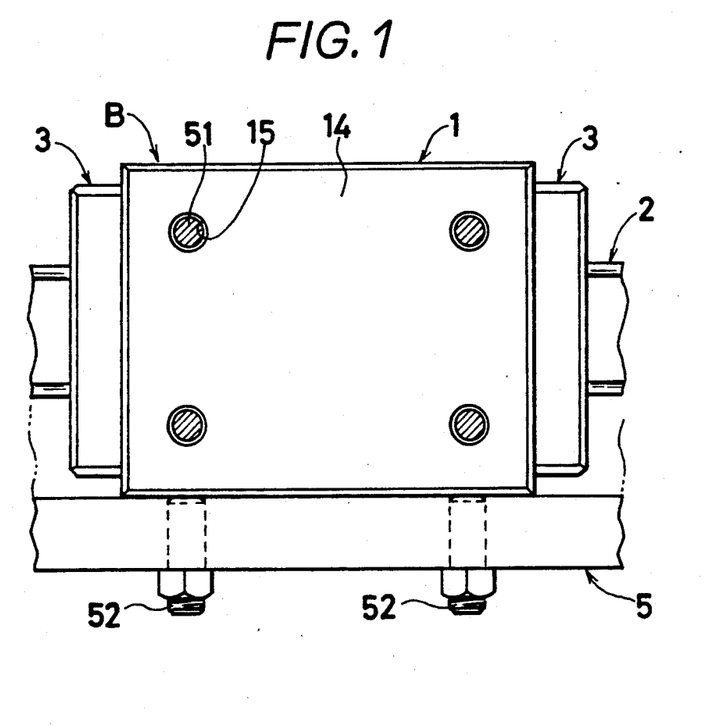
FIG. 1 is a plan view showing a first embodiment of a rectilinear sliding bearing according to the present invention.
Figure 2:
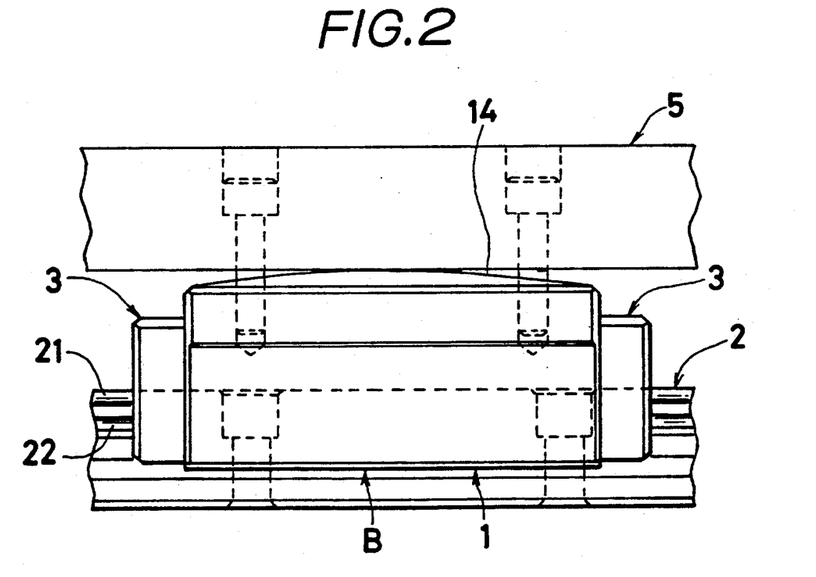
FIG. 2 is a side view corresponding to FIG. 1.
Figure 3:
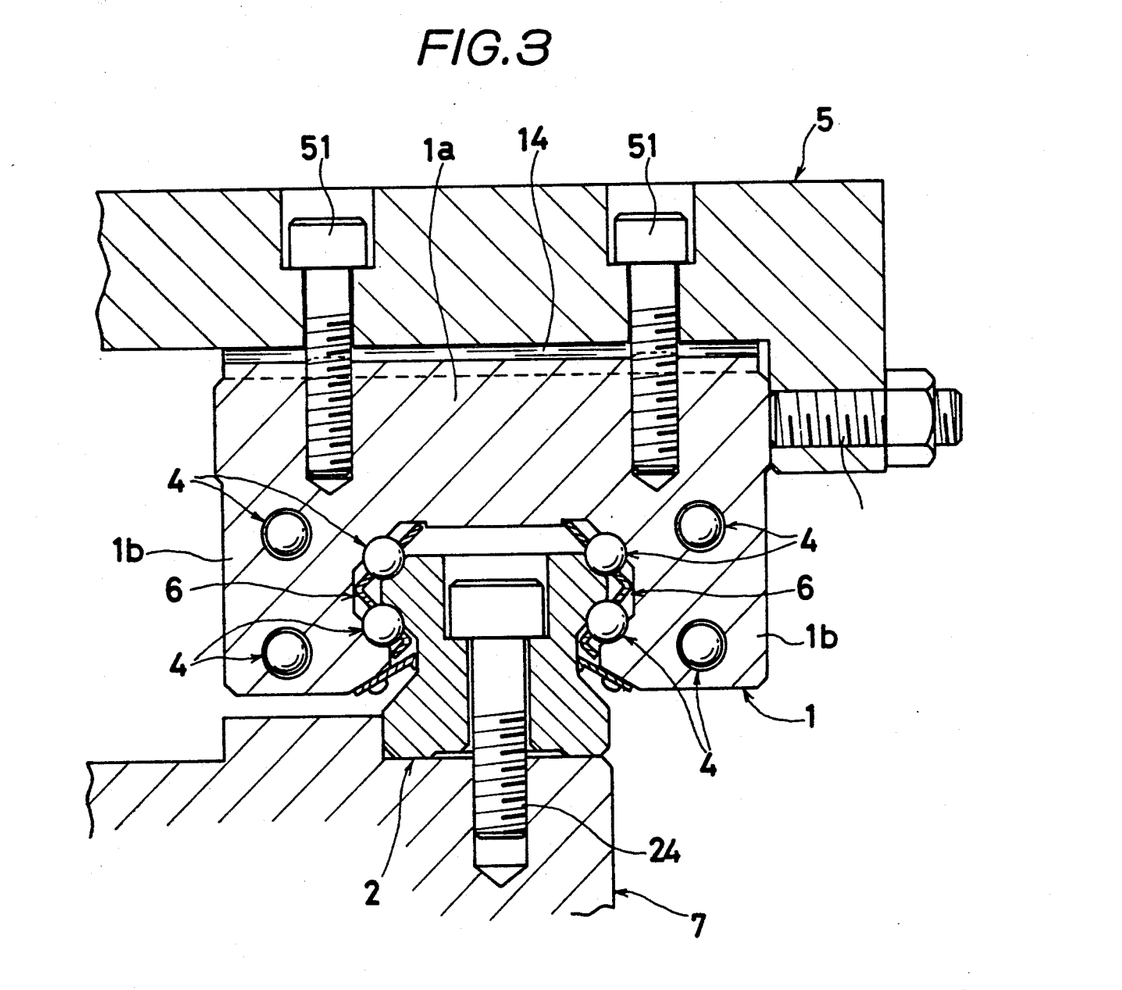
FIG. 3 is a sectional front view showing the rectilinear sliding bearing in assembled form according to the first embodiment.

The rectilinear sliding bearing comprises a slide body 1 of substantially C-shape in cross section which has a horizontal portion 1a, left and right wing portions 1b extending downward from both ends of the horizontal portion, and a concave portion opened on the lower side; a pair of covers 3 attached to the front and rear ends of the slide body 1; a pair of ball retainers 6 provided inside the left and right wing portions 1b of the slide body 1; a rail 2 fixed to a machine or the like by means of fixing bolts acting as fixing means; and a number of balls 4 for bearing loads between the slide body 1 and the rail 2 while circulating through endless ball tracks defined by the slide body 1 and the covers 3.

Figure 4:
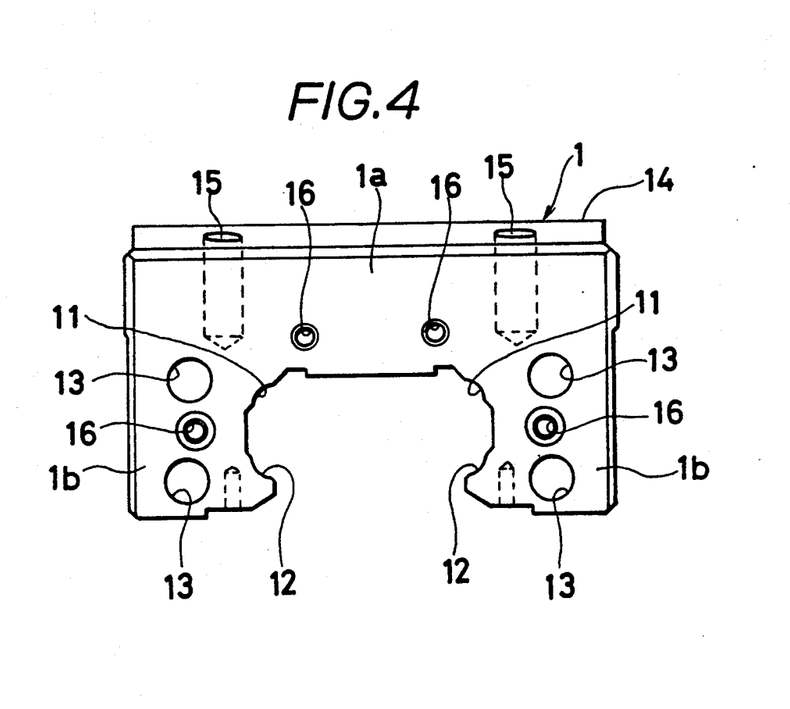
FIGS. 4 and 5 are a front view and a side view, respectively, showing a slide body of the rectilinear sliding bearing according to the first embodiment.
Figure 5:
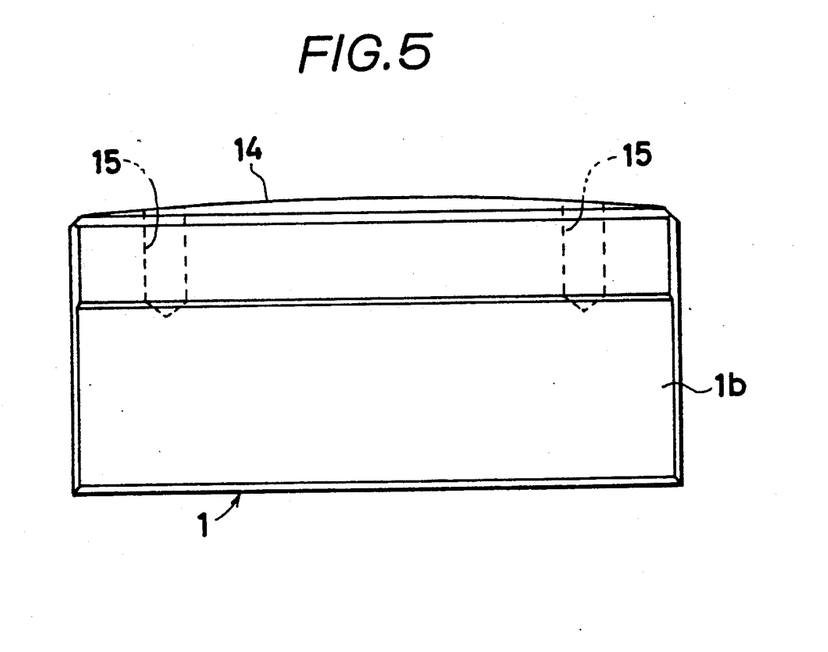

As shown in FIGS. 4 and 5, the slide body 1 is substantially C-shaped in cross section, and the inner surface of each of the left and right wing portions 1b has upper and lower load rolling surfaces 11 and 12 extending in the axial direction whose radius of curvature is larger than the radius of the balls. The normal line of the upper load rolling surface 11 is inclined downward at 45 degrees to the horizontal and the normal line of the lower load rolling surface 12 is inclined upward at the same angle. Each of the left and right wing portions 1b has no-load rolling holes 13 formed therein correspondingly to the upper and lower load rolling surfaces 11 and 12. The slide body 1 has on its upper side an attaching surface 14 which is curved in the moving or axial direction with a small radius of curvature, and attaching holes 15 formed therein in which coupling bolts 51 passing through a moving body 5 from top to bottom are fitted. Reference symbol 16 designates screw holes in which fixing or attaching bolts 31 for the covers 3 are fitted.

Each of the covers 3 made of synthetic resin is fixed to either axial end of the slide body 1 by the fixing bolts 31. As shown in FIGS. 8 through 11, each cover 3 has ball turning paths 32 formed therein for connecting the load rolling surfaces 11 and 12 and the corresponding no-load rolling holes 13 of the slide body 1. Each ball turning path 32 is completed by fitting a semi-circular guide piece 33 (having a guide surface 34 made compatible with the load rolling surface 11, 12) in each ball guide groove 35 formed in each cover 3. Reference symbol 36 designates an attaching hole through which the fixing bolt 31 is passed.

Each of the ball retainers 6 is fabricated by stamping a metal plate as to have a substantially L-shape in cross section and two elongate holes whose width is smaller than the diameter of the balls 4. Each ball retainer 6 acts to eject the balls 4 rolling on the load rolling surfaces 11 and 12 from the elongate holes and bring them into contact with the rolling surfaces of the rail 2, and also to prevent the balls 4 from coming off the load rolling surfaces 11 and 12 of the slide body 1 when a slider B is detached from the rail 2.

The slider B having the endless tracks through which the balls 4 circulate is completed by attaching the covers 3 and the ball retainers 6 to the slide body 1.

Figures 6, 7:
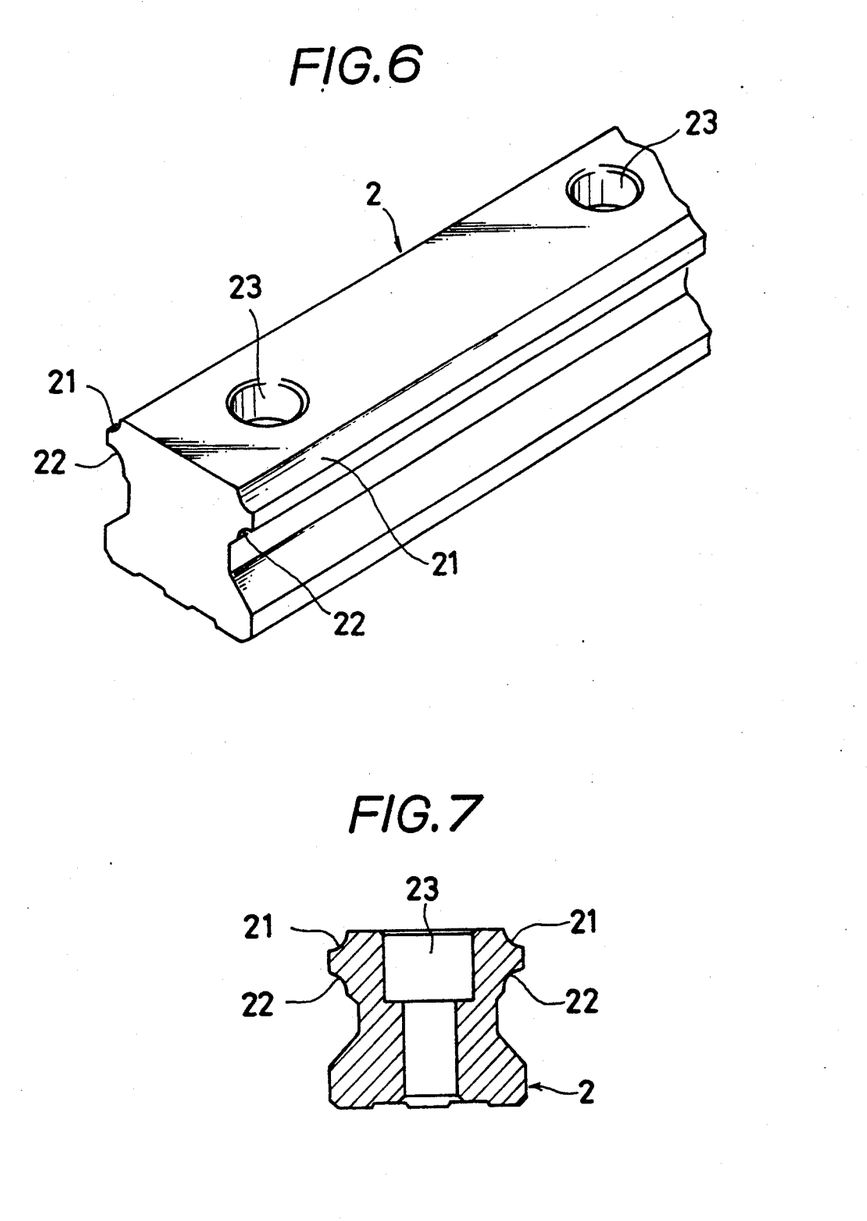
FIGS. 6 and 7 are a perspective view and a sectional view, respectively, showing a rail according to the first embodiment.
Figure 8:
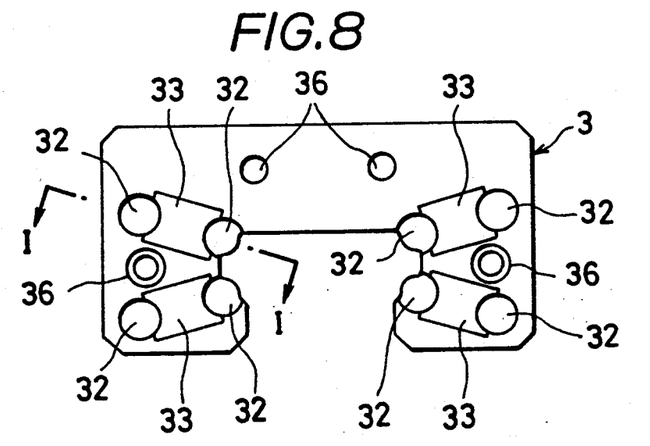
FIG. 8 is a front view showing a cover according to the first embodiment.
Figure 9:
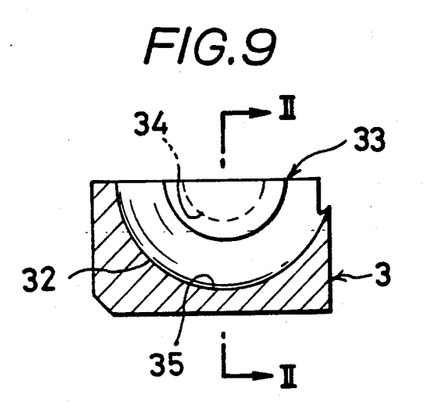
FIG. 9 is a sectional view taken along line I—I in FIG. 8.
Figure 10:
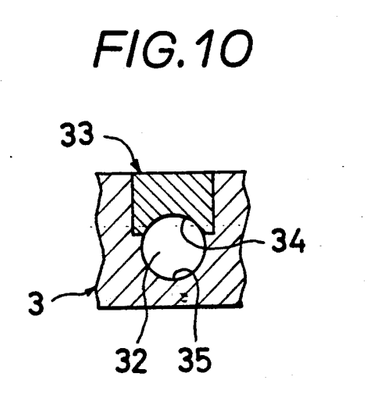
FIG. 10 is a sectional view taken along line II—II in FIG. 9.
Figure 11:
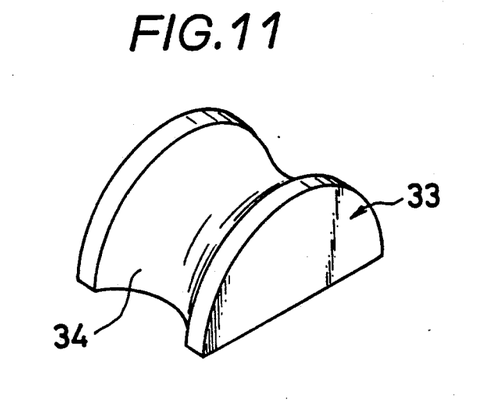
FIG. 11 is a perspective view showing a guide piece according to the first embodiment.

The rail 2 is fabricated by cutting off a part of trapezoidal shape in cross section from either lateral side of a raw body of rectangular shape in cross section and cutting off left and right shoulder portions. Each downward-facing oblique surface formed by cutting off the trapezoidal part defines a lower rolling surface 22 corresponding to the lower load rolling surface 12 formed in the inner surface of the wing portion 1b of the slide body, and each upward-facing oblique surface formed by cutting off the shoulder portion defines an upper rolling surface 21 corresponding to the upper load rolling surface 11 formed also in the inner surface of the wing portion 1b of the slide body. The rail 2 has fixing-bold insertion holes 23 formed in a central portion orthogonally to the upper surface at adequate intervals in the longitudinal direction thereof, through which fixing bolts 24 to be screwed to a fixing section 7 are passed.

To assemble the rectilinear sliding bearing of the foregoing structure to a rectilinear sliding table for guiding a machine in rectilinear reciprocative motion, as shown in FIG. 3, the rail 2 is fixed to the fixing section 7 such as a bed by means of the fixing bolts 24, and the moving body 5 is fixed by means of the coupling bolts 51 to the attaching surface 14 of the slider B capable of moving along the rail 2.

In this assembling process, the attaching surface or curved surface 14 of the slide body 1 is compressed by tightening the coupling bolts 51, whereby the slider B and the moving body 5 are fixed together. At this time, the coupling bolts 51 undergo elastic deformation, such as elongation or contraction, and the slider B and the moving body 5 are brought into rolling contact with each other, thereby causing relative displacement.

Therefore, when the slider B receives external vertical loads because of the presence of the attaching error and the like of the rail 2, relative displacement occurs between the slider B and the moving body 5, whereby fluctuations in posture of the slider B owing to external loads are absorbed or moderated, so that the accuracy in rectilinear motion of the moving body 5 is kept high.

Figure 13:
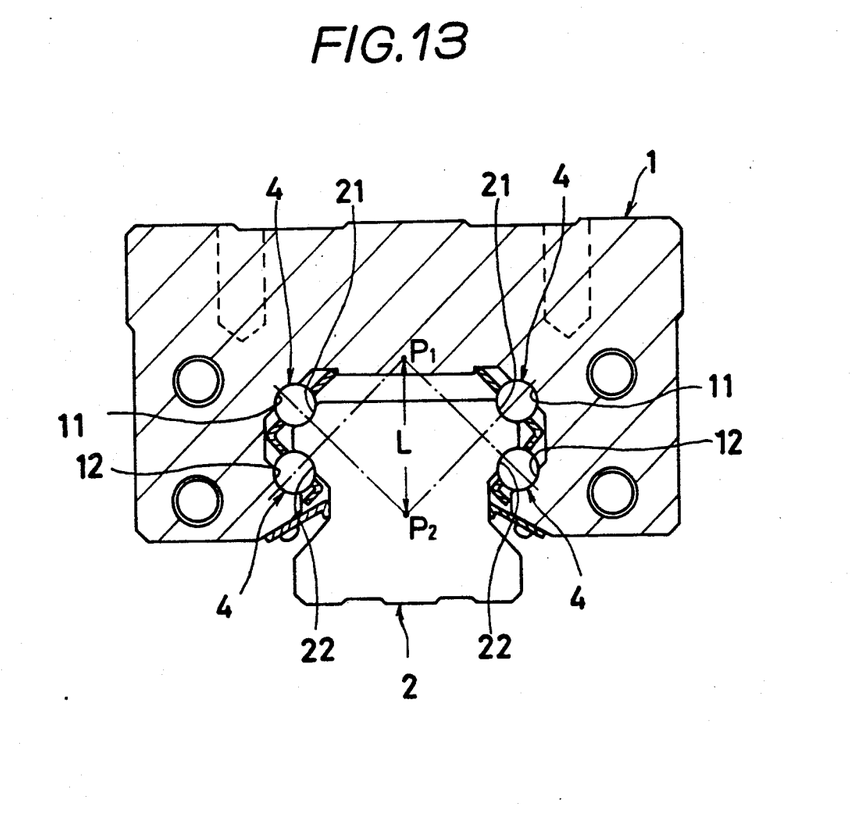
FIG. 13 is a sectional view showing a load working point in the slide body according to the first embodiment.

In this embodiment, the angle of contact of the balls 4 with the load rolling surfaces 11 and 12 and with the rolling surfaces 21 and 22 in relation to the horizontal is 45 degrees over the whole length of the endless track; thus, the rectilinear sliding bearing is similar in ball contact angle to a so-called angular contact bearing (which is one type of rotary bearing). Therefore, a load working point when a load acts on the slider B is located at $P_1$ and $P_2$ as shown in FIG. 13, so that the distance L between these working points becomes short. Consequently, even when loads acting at $P_1$ and $P_2$ are not in balance, a moment load acting on the slider B can be reduced, that is, the rectilinear sliding bearing has the so-called automatic adjusting function. Accordingly, with the advantage that the moving body 5 and the slider B can undergo relative displacement, the present invention can absorb the attaching error of the rail 2 to smoothly guide the moving body 5 in rectilinear motion with accuracy.

SECOND EMBODIMENT

Although the first embodiment includes the curved attaching surface 14 provided on the slider B of the rectilinear sliding bearing having the automatic adjusting function, this second embodiment is implemented by applying the present invention to a rectilinear sliding bearing having the so-called automatic aligning function.

Figure 15:
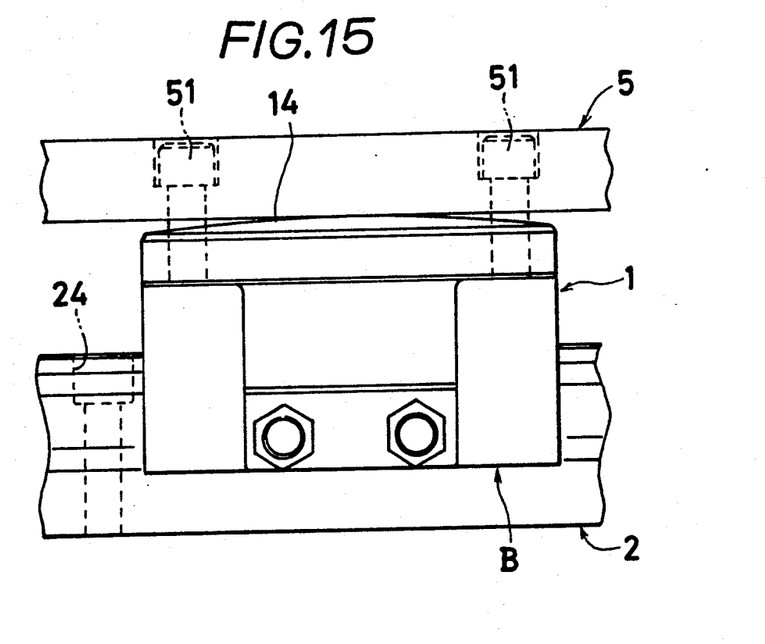
FIGS. 15 and 16 are a side view and a sectional front view, respectively, showing a second embodiment of the rectilinear sliding bearing according to the present invention.
Figure 16:
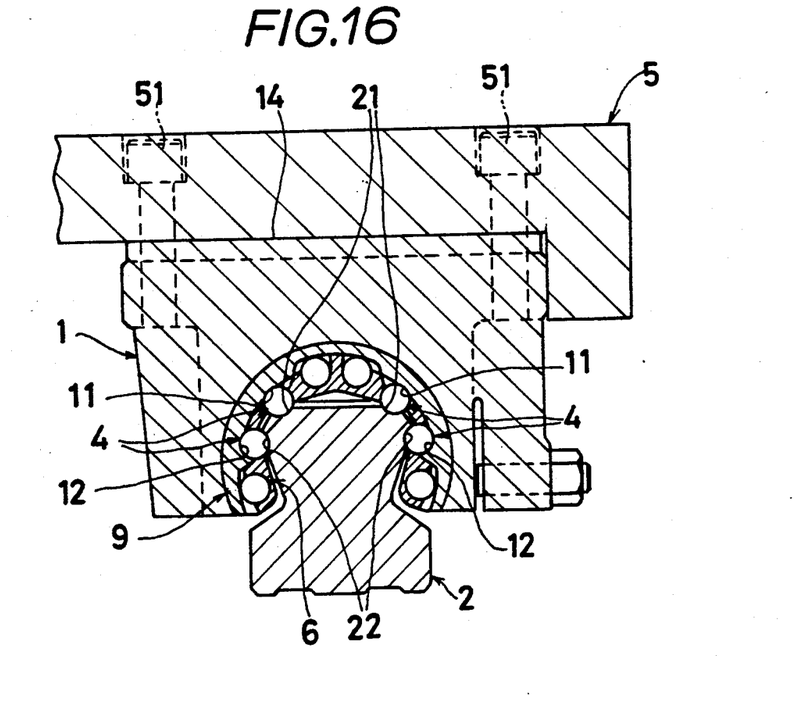

FIGS. 15 and 16 show a second embodiment of the rectilinear sliding bearing. That is, the slider B comprises a bearing race 9 made of a cylindrical body those axially-extending portion is cut off to define a concave portion opened on the lower side (an upper half portion of the rail 2 is passed through this concave portion with a certain gap left between them), and a block 1 which has an attaching surface 14 for fixing the moving body 4 by means of the coupling bolts 51 and surrounds the bearing race 9 tightly. The angle of contact of the balls 4 with the load rolling surfaces 11 and 12 differs from that of the first embodiment. Other structural points of the second embodiment are substantially identical with those of the first embodiment.

In the bearing race 9, the inner surface of the concave portion has two upper load rolling surfaces 11 and two lower load rolling surfaces 12 extending in the axial direction, the upper load rolling surface 11 faces downward orthogonally to the horizontal plane, the lower load rolling surface 12 faces upward at 30 degrees to the horizontal plane, and upon contact of the balls 4, the automatic adjusting function as in the first embodiment acts on the bearing race 9. A ball retainer 6 is provided inside the concave portion of the bearing race 9 as to cover the load rolling surfaces 11 and 12, and in conjunction with the inner surface of the bearing race 9, defines endless ball tracks.

The block 1 has a curved surface on the upper side which defines an attaching surface 14 for the moving body 5 as in the first embodiment, and a concave portion on the lower side which receives the bearing race 9.

In this second embodiment, when a moment load acts on the slider B, relative displacement occurs between the bearing race 9 and the block 1, whereby no excessice load is imposed on the balls 4, so that the balls 4 can slide on the rail 2.

Therefore, because of the presence of the curved attaching surface 14 of the slider B, the accuracy in rectilinear motion of the moving body 5 is never influenced by the pitching of the slider B resulting from the waving of the rail 2, and the moving body 5 can be smoothly guided even where the attaching error of the rail 2 is comparatively large.

THIRD EMBODIMENT

This embodiment is substantially identical with the first embodiment, except that the shape of the slider B, the angle of contact of the balls 4, and the number of endless tracks differ from those of the first embodiment.

Figure 17:
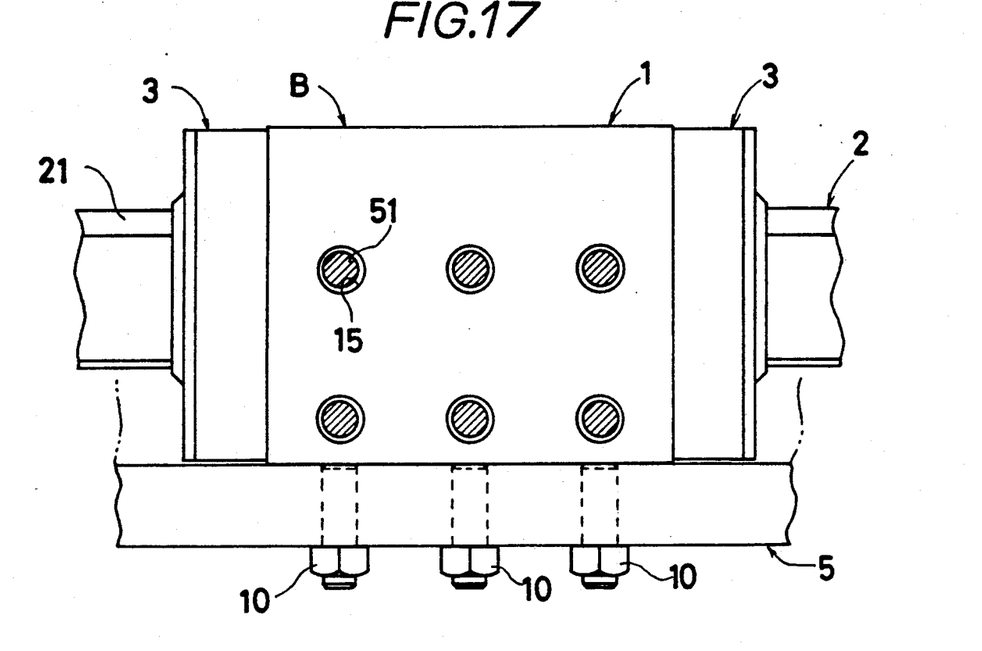
FIGS. 17, 18 and 19 are a plan view, a side view and a sectional front view, respectively, showing a third embodiment of the rectilinear sliding bearing according to the present invention.
Figure 18:
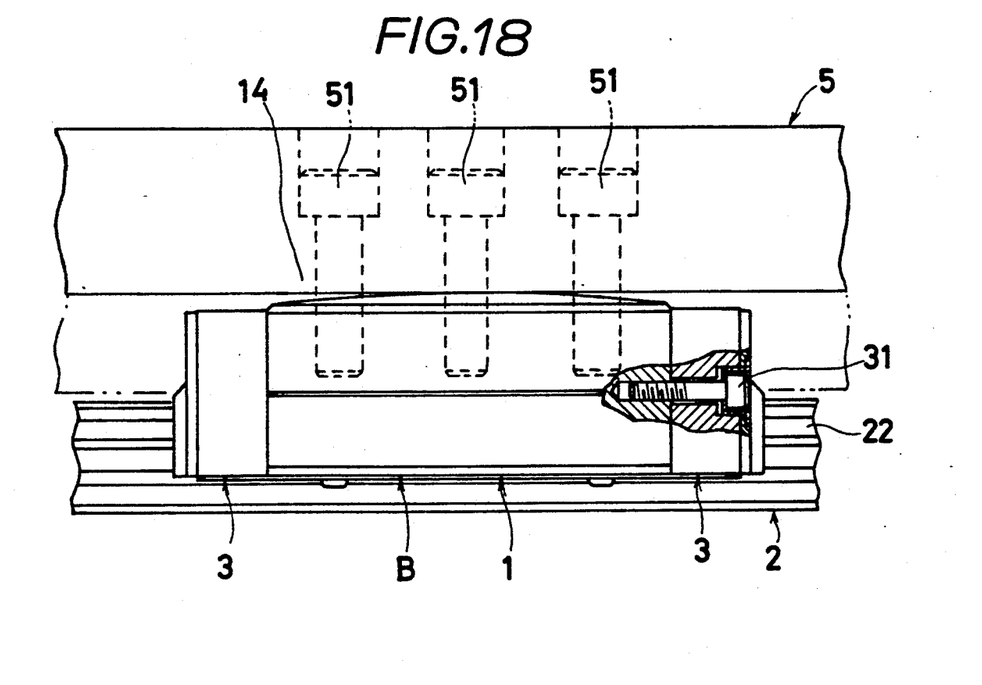
Figure 19:
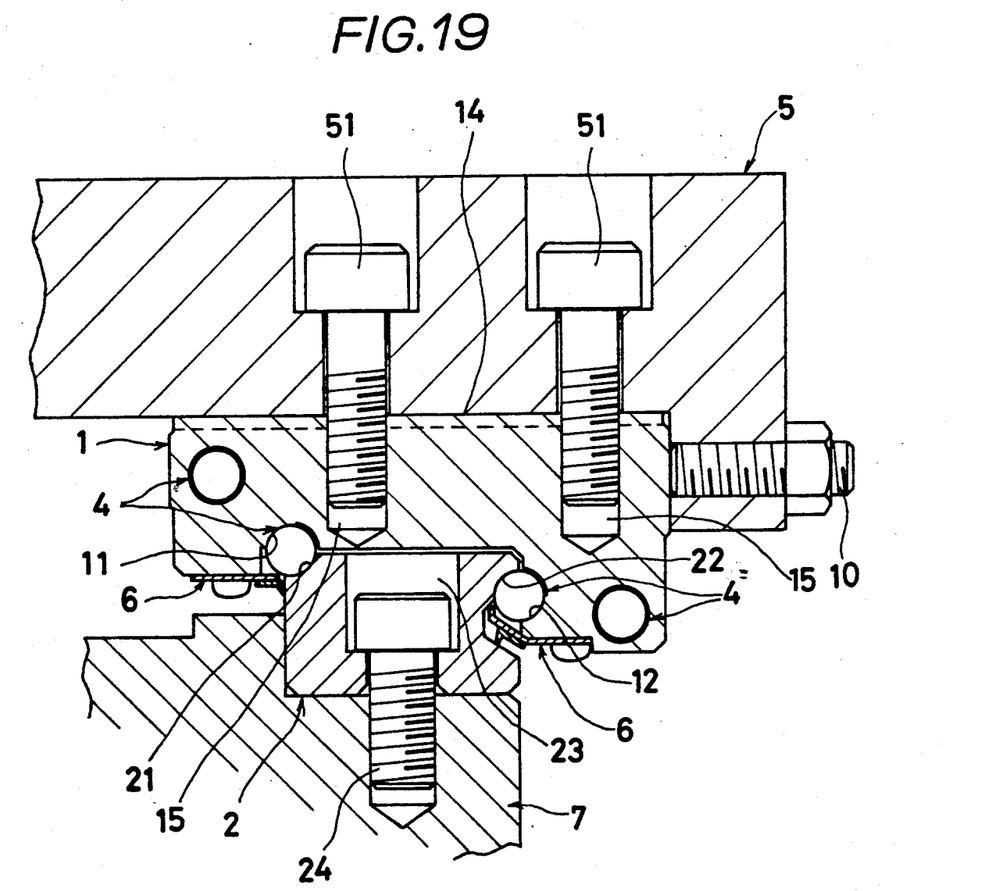

As shown in FIGS. 17 through 19, the slider B comprises a slide body 1 of substantially L-shape in cross section which has a horizontal portion 1a, two wing portions 1b extending downward from both ends of the horizontal portion, and a concave portion opened in an obliquely downward direction; a pair of covers 3 attached to the front and rear end face of the slide body 1; and ball retainers 6 attached to the lower ends of the wing portions 1b.

The inner surface of each of the wing portions 1b of the slide body has a load rolling surface 11, 12; a no-load rolling hole 13 is formed in each wing portion correspondingly to the load rolling surface 11, 12; and these load rolling surfaces and no-load rolling holes in conjunction with the ball retainers 6 and ball turning paths formed in the covers 3 define endless ball tracks. A moving-body attaching surface 14 of the slide body 1 is curved as in the first embodiment. Reference symbol 10 designates a sidewise pressure bolt for pressing one side face of the slide body 1 to apply pre-load to the balls 4.

Therefore, in this third embodiment also, the coupling bolts 51 underto elastic deformation, such as elongation or contraction, and the slider B and the moving body 5 are brought into rolling contact with each other to cause relative displacement, so that because of the presence of the curved attaching surface 14, the accuracy in rectilinear motion of the moving body 5 is never influenced by the pitching of the slider B resulting from the waving of the rail 2.

Figure 12:
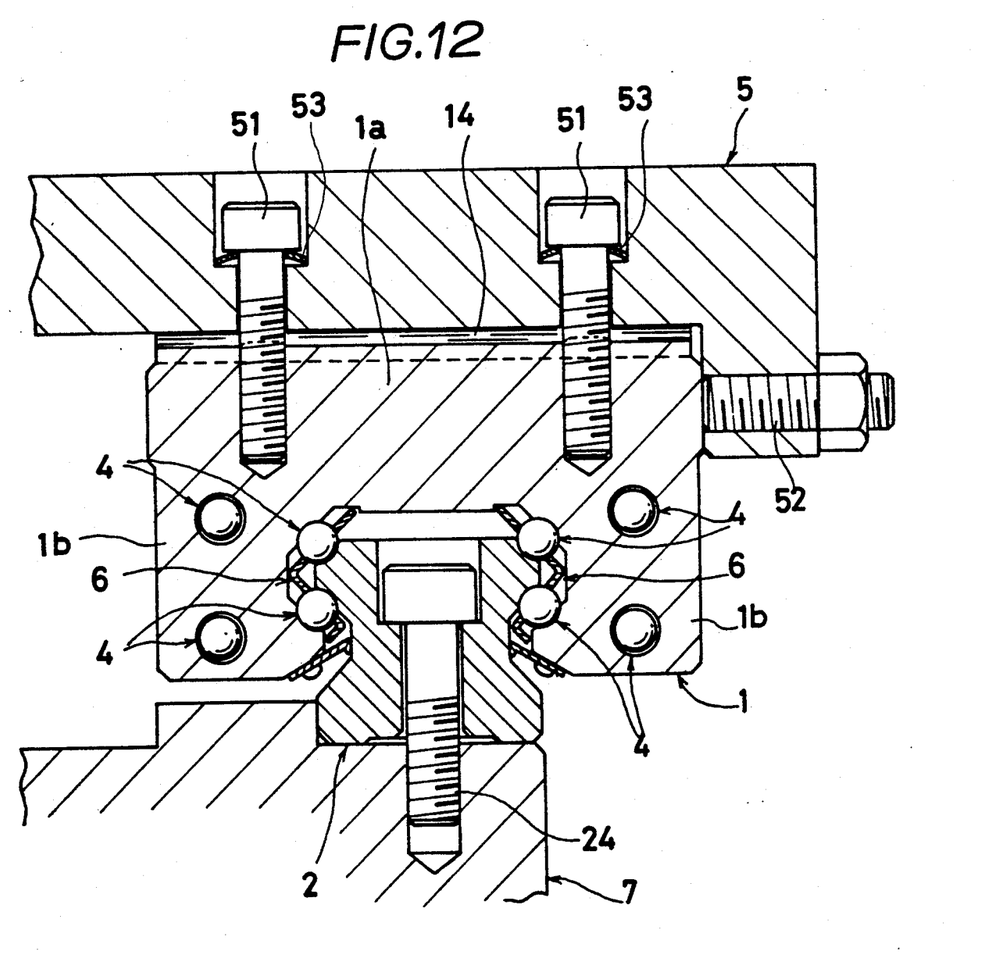
FIG. 12 is a sectional front view showing the rectilinear sliding bearing according to the first embodiment in which a conical spring washer is attached to a coupling bolt.

Each of the foregoing embodiments uses the coupling bolts 51 which completely connect the slider B and the moving body 5 together while allowing them to undergo relative displacement. However, where a conical spring washer 53 is interposed between the moving body 5 and the coupling bolt 51 as shown in FIG. 12 and the coupling bolt 51 is fastened to such an extent as not to completely compress the conical spring washer 53, relative displacement occurs easily between the slider B and the moving body 5; in this case, even small fluctuations in posture of the slider B can be absorbed or moderated, thereby improving the accuracy in rectilinear motion of the moving body 5.

As will be appreciated, several components of the second and third embodiments which are identical with or correspond to those of the first embodiment are designated by the same reference symbol, with their description not duplicated.

Figure 14:
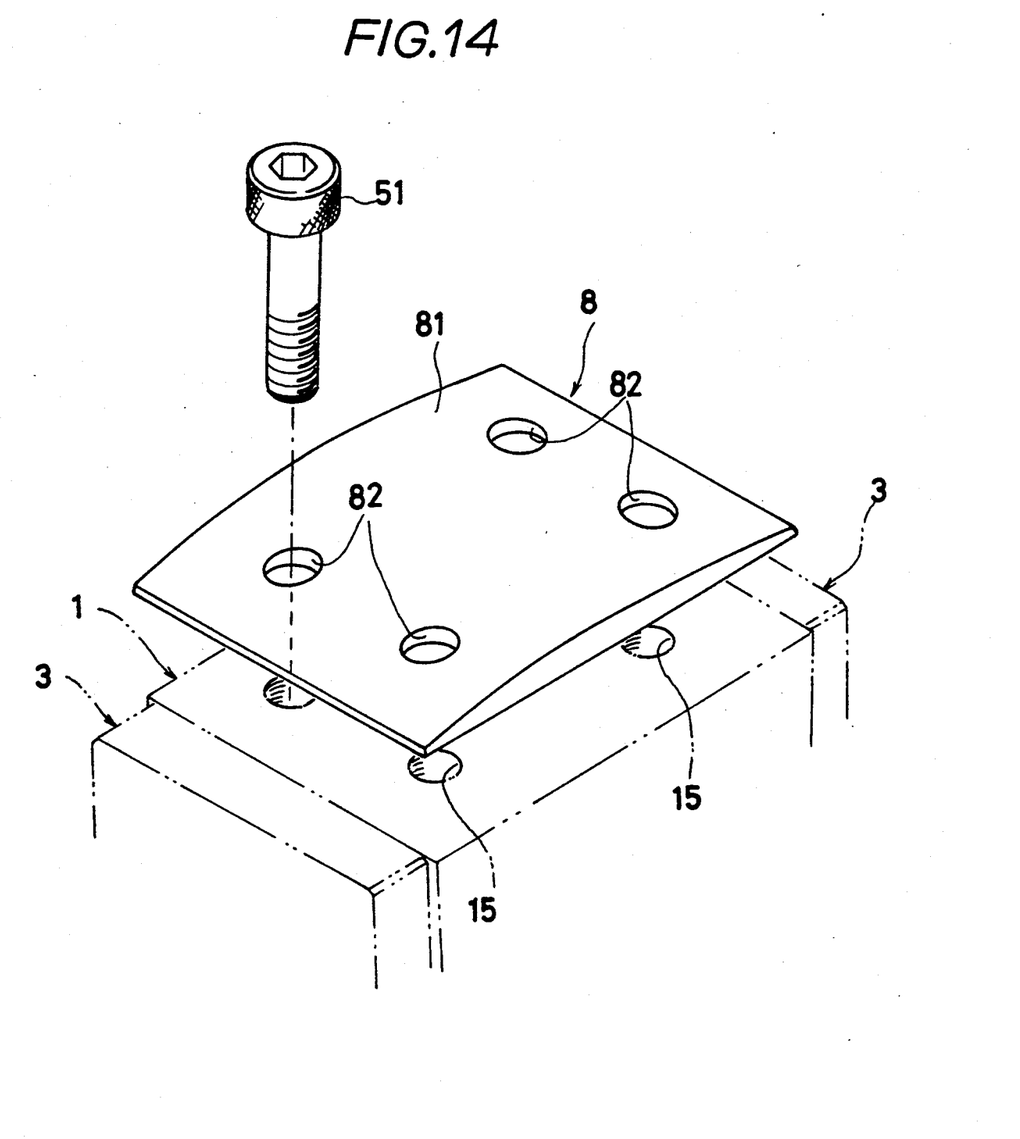
FIG. 14 is a schematic perspective view showing a spacer.

Each of the foregoing embodiments shows the attaching surface directly provided on the upper side of the slide body. However, the present invention may be implemented by the use of a spacer 8 as shown in FIG. 14.

This spacer 8 is in the form of a substantially flat plate with through holes 82 for the coupling bolts 51, whose one face is curved to define a curved surface 81. To assemble the rectilinear sliding bearing of the present invention, the spacer 8 is interposed between the slide body 1 and the moving body 5 where the respective attaching surfaces of the slide body 1 and the moving body 5 are flat.

Therefore, by the use of the spacer 8, the assembling method of the present invention can be readily practiced in or applied to the conventional rectilinear sliding bearing whose attaching surface 14 for the moving body 5 is flat, this resulting in the same effect as is the case of the rectilinear sliding bearing according to the present invention.

Here, it is no matter whether the curved surface 81 faces the slider B or the moving body 5.

In the drawings showing the embodiments, to facilitate understanding of the present invention, the radius of curvature of the attaching surface is shown in exaggerated form to such an extent that anyone can visually perceive it.

INDUSTRIAL APPLICABILITY

As described above, according to the rectilinear sliding bearing and the assembling method thereof of the present invention, the pitching of the slider resulting from the attaching error of the rail can be absorbed or moderated, the positional accuracy of the moving body can be enhanced, and the machining accuracy of a machine tool or the like mounted on the moving body can be improved.

Further, the slider and the moving body are brought into rolling contact with each other to undergo relative displacement, and such relative displacement is not impeded by the frictional force between them; therefore, the foregoing effect can always be exerted.

Further, the curved surface is compressed in proportion to the amount of tightening of the coupling bolt and the amount of load/weight of the moving body to result in a corresponding area of surface contact between the slider and the moving body; therefore, loads never act on one point of the slider concentratedly, and the durability of the slider can be enhanced.

What is claimed is:

1. A rectilinear sliding bearing comprising
a slider of subtantially C-shape in cross section having a horizontal portion, a pair of wing portions extending downward from both ends of the horizontal portion, a concave portion opened on the lower side which is defined by the horizontal portion and the two wing portions, an attaching surface to which a moving body such as a table is fixed by means of coupling bolts, a downward-facing upper load rolling surface and an upward-facing lower load rolling surface axially formed in the inner surface of each of the wing portions, and no-load rolling paths for defining endless tracks in conjunction with the upper and lower load rolling surfaces.
a rail having rolling surfaces formed in confronting relation to the upper and lower load rolling surfaces along which the slider moves, and
a number of rolling elements, such as balls or rollers, for bearing loads between the upper and lower load rolling surfaces of the slider and the rolling surfaces of the rail while circulating through the endless tracks,
chracterized in that the attaching surface of the slider is made in the form of a curved surface having a small radius of curvature in the moving direction so that when the moving body is fixed by tightening the coupling bolts, the attaching surface is brought into pressure contact with the moving body to undergo elastic deformation, and the elastic deformation of the attaching surface causes relative displacement between the slider and the moving body, thereby absorbing or moderating the structural error of the rail.

2. A rectilinear sliding bearing according to claim 1, wherein the slider is composed of
a bearing race formed by cutting off an axially-extending portion of a cylindrical body to define the concave portion opened on the lower side, the inner surface of the concave portion having the upper and lower load rolling surfaces, and
a block fitted on the bearing race and having the attaching surface to which the moving body such as a table is fixed by means of the coupling bolts.

3. A rectilinear sliding bearing comprising
a slider having a horizontal portion, two wing portions extending downward from both ends of the horizontal portion, a concave portion opened in an obliquely downward direction which is defined by the horizontal portion and the two wing portions, an attaching surface to which a moving body such as a table is fixed by means of coupling bolts, a downwardly-inclined load rolling surface axially formed in the inner surface of one wing portion, an upwardly-inclined load rolling surface axially formed in the inner surface of the other wing portion, and no-load rolling paths for defining endless tracks in conjunction with the load rolling surfaces,
a rail having rolling surfaces formed in confronting relation to the load rolling surfaces along which the slider moves, and
a number of rolling elements, such as balls or rollers, for bearing loads between the load rolling surfaces of the slider and the rolling surfaces of the rail while circulating through the endless tracks,
characterized in that the attaching surface of the slider is made in the form of a curved surface having a small radius of curvature in the moving direction so that when the moving body is fixed by tightening the coupling bolts, the attaching surface is brought into pressure contact with the moving body to undergo elastic deformation, and the elastic deformation of the attaching surfaces causes relative displacement between the slider and the moving body, thereby absorbing or moderating the structural error of the rail.

4. A method of assembling a rectilinear sliding bearing in which a slider moves rectilinearly along a rail with interposition of a number of endlessly-circulatable rolling elements, such as balls or rollers, by fixing a moving body such as a table to the slider, comprising the steps of
making the moving-body attaching surface of the slider into the form of a curved surface having a small radius of curvature in the moving direction, and
bringing the moving body into pressure contact with the attaching surface by tightening coupling bolts to cause the attaching surface to undergo elastic deformation,
whereby the elastic deformation of the attaching surface causes relative displacement between the slider and the moving body to absorb or moderate the structural error of the rail.

* * * * *